United States Patent [19]

Sawhney

[11] 3,767,856

[45] Oct. 23, 1973

[54] DATA SET TESTER

[75] Inventor: Ramesh Sawhney, Ann Arbor, Mich.

[73] Assignee: Burroughs Corporation, Detroit, Mich.

[22] Filed: July 20, 1971

[21] Appl. No.: 164,275

[52] U.S. Cl. ........................ 178/69 A, 179/175.1 R

[51] Int. Cl. ........................ H04m 3/08, H041 25/00

[58] Field of Search ..................... 178/69 A; 328/59, 328/61, 141, 134; 324/79 D

[56] References Cited

UNITED STATES PATENTS

| | | | |
|---|---|---|---|
| 3,657,658 | 4/1972 | Kubo | 328/61 |
| 3,057,957 | 10/1962 | Gibby et al. | 178/69 A |
| 2,587,561 | 2/1952 | Wilder | 178/69 A |
| 3,549,997 | 12/1970 | Rötzel | 324/79 D |
| 3,532,992 | 10/1970 | Stevens | 328/59 |
| 3,541,349 | 11/1970 | Bright et al. | 328/59 |
| 3,058,063 | 10/1962 | Sher | 324/79 D |
| 3,655,915 | 4/1972 | Liberman et al. | 179/175.1 R |

*Primary Examiner*—Kathleen H. Claffy
*Assistant Examiner*—Douglas W. Olms
*Attorney*—Paul W. Fish

[57] ABSTRACT

A portable data set tester having means for generating a predetermined cyclic pattern of mark and space signals is adaptable to system check either a single data set or a data communication system. Additionally the data set tester includes a bias distortion meter checking circuit for checking the quality of the data set receiver and means for a frequency comparison of the transmitter oscillator of the data set with a standard crystal controlled frequency generator in the tester.

3 Claims, 12 Drawing Figures

INVENTOR
RAMESH SAWHNEY
BY
Russel C. Wells
ATTORNEY

DATA SET TESTER

FIELD OF INVENTION

This invention relates to a testing apparatus for generating a plurality of cyclic signal patterns to be applied to a data set in general and in particular to a means for comparing the frequency of the signals of the data set transmitter with a standard frequency.

SUMMARY OF INVENTION

It is an object of the invention to compare the frequencies of the data set transmitter with a standardized frequency from a crystal oscillator and further to indicate to the operator when the transmitter frequency is the same frequency as the standard frequency.

It is another object of the invention to generate a predetermined signal pattern having a known ratio of mark and space signals, to apply the signal pattern to a data set and to measure the bias distortion of the received signal from the data set.

In accordance with these and other objects, there is described and claimed herein a data set tester for generating a known signal pattern for use in testing the operation of a data set. The tester comprises a crystal oscillator having a very stable frequency for generating as a source, a high frequency pulse train. The pulse train from the oscillator is divided by electrical means into at least two different pulse trains each having a substantially lower frequency than said crystal. Either of the two lower frequency pulse trains are selected by a bit rate selection means to be used to generate a desired bit rate signal pattern. The signal output from the bit rate selector means is further divided and according to a bit pattern generator selector, the desired ratio of space-mark signal cyclic signal pattern is generated.

DETAILED DESCRIPTION

Figure 2:
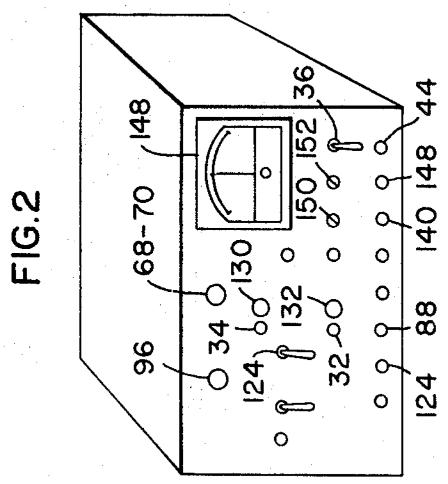
FIG. 2 is a perspective view of the data set tester showing the control panel thereof.
Figure 1:
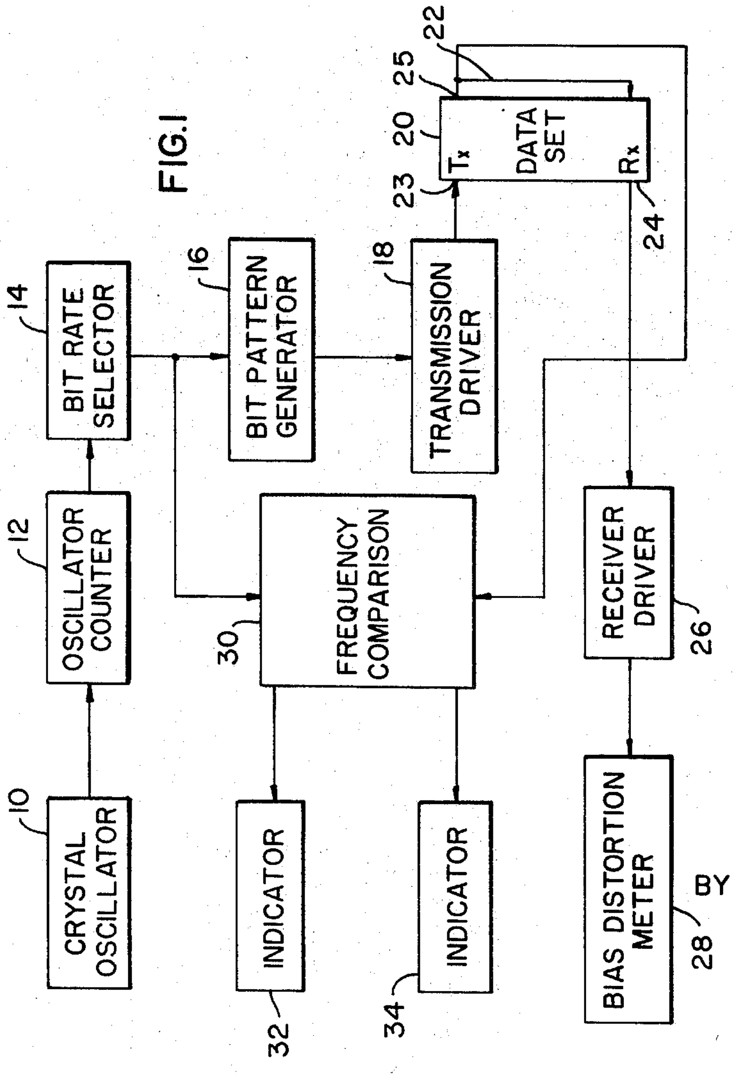
FIG. 1 is a block diagrammatic illustration of the data set tester according to this invention.

Referring to the FIGS. by the characters of reference, there is illustrated in FIG. 1 a block diagram of the data set tester according to the present invention. A crystal oscillator 10 provides a source of extremely stable high frequency pulses which are supplied to an oscillator counter 12. The function of the counter is to reduce the frequency of the pulses from the oscillator to a lower frequency by the process of division. In the preferred embodiment, the output of the oscillator counter is either one of two lower frequency signals which are substantially less than the output frequency of the crystal oscillator 10.

The data set tester of the preferred embodiment to be described herein is capable of testing low and medium speed asynchronous data sets having bit rates of 300, 600, 1,200, 1,800 or 2,200 bits per second. The bit rate selector 14 functions to receive either one of the two low frequency signals from the oscillator counter 12 and further divide the frequency of said signal to correspond to the selected bit rate. A bit pattern generator 16 receives the selected bit rate signal from the bit rate selector 14 and generates a predetermined cyclic pattern of mark and space pulses. As will hereinafter be shown in the preferred embodiment seven different cyclic bit patterns are capable of being generated although many other patterns can be generated according to the teaching herein.

The generated signals from the bit pattern generator 16 are supplied to a transmission driver 18 which conditions the signal to be applied directly to the transmit input 23 of the data set to be tested. In FIG. 1 the data set to be tested is represented by the data set 20 which shows a local test wrap around connection 22 between the transmit and receive output terminals. Thus, the signal applied to the transmit input 23 of a data set to be tested has a predetermined cyclic bit pattern of mark and space pulses at a very stable bit rate.

The receive terminal 24 of the data set being tested is operatively connected to the data set tester and the pulses or signals which are received by the data set are processed therein and then are received by the receiver driver 26 of the tester. The receiver driver 26 functions to condition the pulses as received and applies them to the input of a duty cycle or bias distortion meter 28. With this connection, the quality of the signal being transmitted and received by the data set can be visually measured.

Additionally, the frequency of the signal being transmitted by the data set 20 may be compared with a standard frequency as generated by the bit rate selector 14. This comparison is performed in the frequency comparison unit 30 which is connected to the transmit output terminal 25 of the data set 20 and is indicated to the operator of the tester by means of the two indicators 32 and 34. With the frequency comparison unit 30 the frequency of the transmitted signal of the data set 20 is tested and as a result of the testing, the two indicators 32 and 34 will indicate any deviation between the standard or tuned signal and the transmitted signal.

Figures 3, 4:
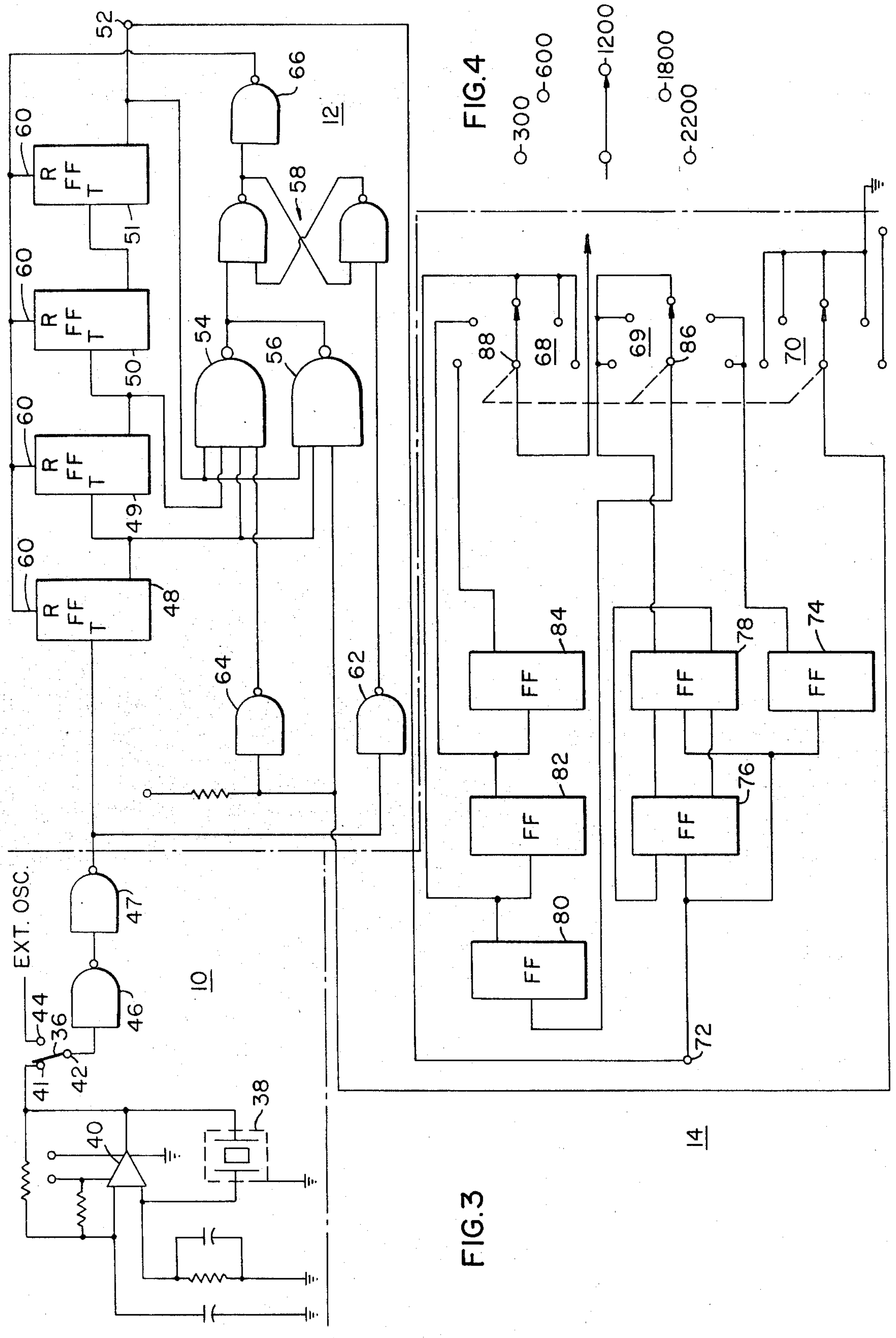
FIG. 3 is a schematic of the crystal oscillator counter and bit rate selector.
FIG. 4 is a legend illustrating the bit rate of the several positions of the three level switch of the bit rate selector of FIG. 3.

Referring to FIG. 3, there is illustrated in schematic form the crystal oscillator circuit 10 including switch means 36 for selecting either the crystal oscillator within the tester or an external oscillator to be applied to the tester. The crystal 38 in the preferred embodiment has a frequency of 79.2 Khz and is electrically connected in circuit with an operational amplifier 40 to provide a pulse train of very stable high frequency pulses to one terminal 41 of the switch means 36. At the common terminal 42 of the switch means, the signals from the oscillator 10 or from an external oscillator connected to the terminal 44 are supplied to a pair of series connected NAND gates 46 and 47 for the purpose of generating the proper logic level signals for the oscillator counter circuit 12.

The oscillator counter circuit 12 is basically a four stage ripple counter comprising flip flops 48–51 which function in conjunction with a counter control circuit to divide the frequency output of the crystal oscillator 10 into either one of two low frequency pulse trains. In the preferred embodiment, as previously mentioned, the output of the crystal oscillator 10 is 79.2 Khz and the output of the oscillator counter 12 at terminal 52 is either 7,200 Hz or 8,800 Hz.

The oscillator counter control circuit comprises a pair of NAND gates 54 and 56 controlling a flip flop 58 for supplying a flip flop reset pulse to the reset terminal 60 of each of the counter flip flops 48–51 after a predetermined count of the counter. The first NAND gate 54 causes the counter to reset on every eleventh pulse and is operative when the bit rate selector 14 is at 300, 600, 1,200 or 1,800 bits per second. The second NAND gate 56 is operative to supply a reset pulse to the counter on every ninth pulse when the bit rate selector 14 selects a bit rate of 2,200. The reset flip flop 58 is illustrated as a pair of cross-coupled NAND gates. The flip flop is set true from a signal from either one of the NAND gates 54 or 56 and is reset by every signal from the crystal oscillator 10 which is supplied through NAND gate 62 to the reset input of the flip flop. The NAND gate 62 functions as an inversion gate to properly condition the signal level for resetting the flip flop 58. The other NAND gate 64 enables the first NAND gate 54 whenever the bit rate selector selects 300, 600, 1,200 or 1,800 bits per second disables that gate when testing for 2,200 bits per second. The NAND gate 66 which is electrically connected to the output flip flop 58 functions as an inversion and drive gate to supply the proper voltage level signal to the reset terminals 60 of the counter flip flops 48–51.

The bit rate selector 14 comprises two sections, namely selector switches 68, 69 and 70 and a division network comprising a plurality of flip flops as will hereinafter be described. FIG. 4 is a legend for each selector switch 68–70 and shows the corresponding bit rate for each position on each of the switches. Thus, reading clockwise in both FIG. 3 and FIG. 4, the first terminal is 300, second terminal is 600 bits per second through the fifth terminal for 2,200 bits per second. In the Figs. the selector switches are selected for 1200 bits per second.

The output terminal 52 of the oscillator counter 12 is electrically connected to the input terminal 72 of the bit rate selector 14. Flip flop 74 having its triggering input electrically connected to the input terminal 72 functions to divide the signal from the counter 12 by two. Thus, in the preferred embodiment where the frequency of the signals of the input terminal 72 is either 7,200 Hz or 8,800 Hz, the output signals of the flip flop 74 is a frequency of 3,600 Hz or 4,400 Hz. The output of the flip flop 74 is electrically connected to both the 1,800 and the 2,200 positions of the selector switch 69.

Additionally the trigger inputs of the flip flop 76 and 78 are likewise electrically connected to the input terminal 72 to receive the signals from the counter 12. These two flip flops function together to divide the input signal by three and the output of the flip flop 78 is electrically connected to the 300, 600 and 1,200 positions of selector switch 69. In the preferred embodiment, the frequency of the output signal of the flip flop 78 is 2,400 Hz. Additionally as will hereinafter be shown, the frequency signal equal to one-third of the 8,800 Hz signal is not utilized in the present tester although it is available.

Flip flops 80, 82 and 84 function to divide the signal from the output terminal 86 of selector switch 69 by two, four or eight respectively. As previously indicated, the frequency of the signals from the output terminal 86 is 2,400 or 4,400 Hz depending upon the position of the selector switches 68–70. In the position as illustrated in FIG. 3, the frequency of the signal at the output terminal 86 is 2,400 Hz which is applied to the trigger input of the flip flop 80. Selector switch 68 is likewise positioned at the 1200 bit selector point and the frequency of the output terminal 88 of selector switch 68 corresponds to the output of the flip flop 80. As previously indicated, flip flop 80 divides the signal in half therefore the frequency at the output terminal 88 is 1,200 Hz. Terminal point 88 corresponds to the output terminal of the bit rate selector.

Selector switch 70 functions to control the conduction of the two NAND gates 56 and 64 in the oscillator counter 12. When selector switch 70 is connected to the 2,200 bit per second position the second NAND gate 56 is enabled and the NAND gate 64 prevents the first NAND gate 54 from generating an output signal capable of setting the flip flop 58. When selector switch 70 is positioned at any of the other four positions, the first NAND gate 54 is enabled and the second NAND gate 56 is disabled.

Figures 5, 6:
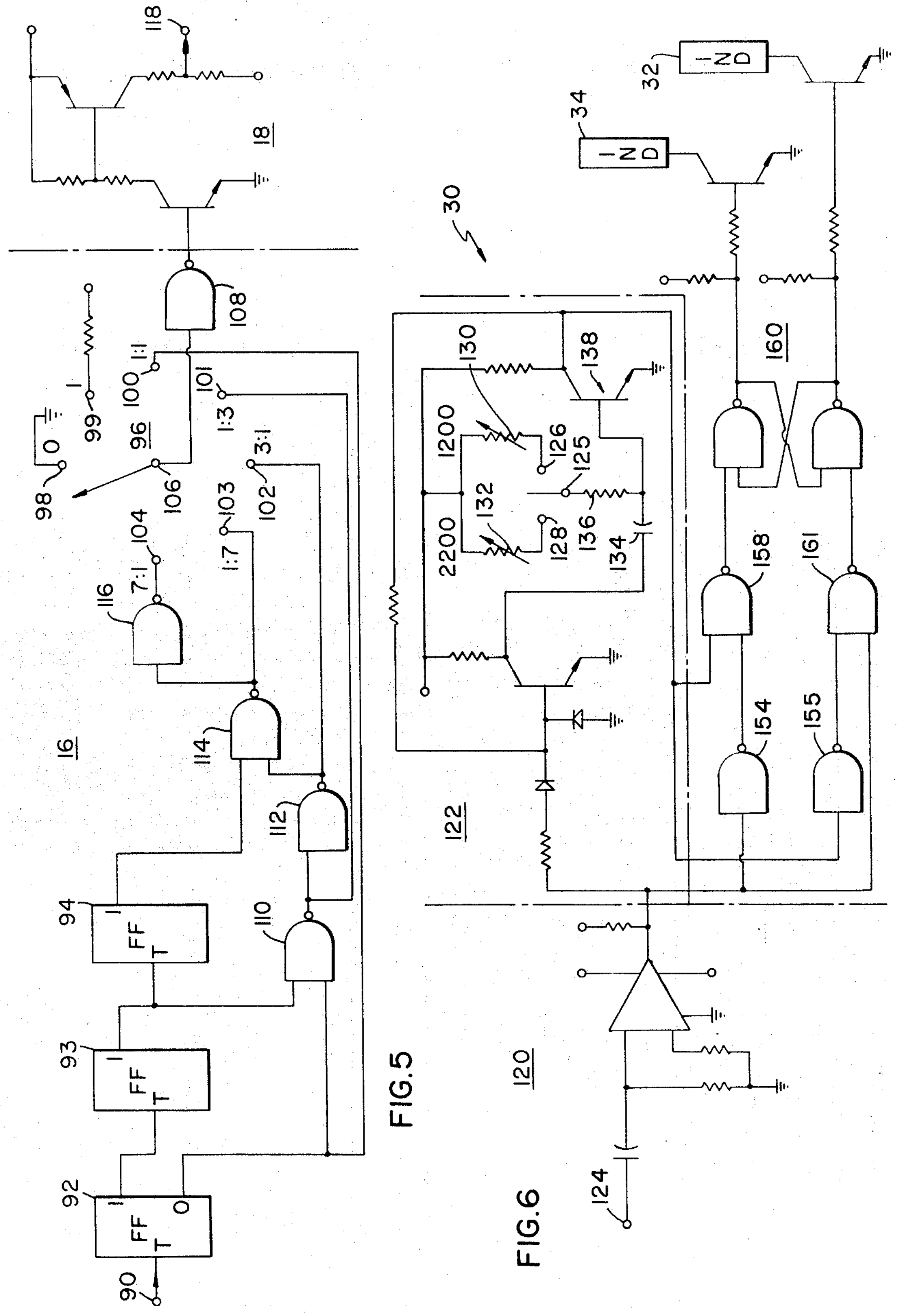
FIG. 5 is a schematic of the bit pattern generator and the transmission driver.
FIG. 6 is a schematic of the frequency comparison section.

The output terminal 88 of the bit rate selector is electrically connected to the input terminal 90 of the bit pattern generator 16 which is schematically illustrated in FIG. 5. The frequency of the signal at the input terminal 90 is twice the frequency necessary for the generation of the selected bit rate. In the bit pattern generator, the frequency of the testing signal is finalized and a predetermined cyclic bit pattern of mark and space signals are generated.

The bit pattern generator comprises a counter section of three flip flops 92, 93 and 94, a seven step selector switch 96 and a plurality of NAND gates. As indicated in the preferred embodiment, the selector switch 96 comprises seven steps for generating seven different signal patterns. Position 98 of the switch is electrically connected to ground for generating a steady mark signal. Position 99 is electrically connected through a current limiting resistor to a voltage for generating a steady space signal. Positions 100 through 104 are positioned to generate space-mark pattern ratios of 1:1, 1:3, 3:1, 1:7 and 7:1 respectively. The output terminal 106 of the selector switch 96 is electrically connected to a NAND gate 108 for logic signal inversion.

Figure 8:
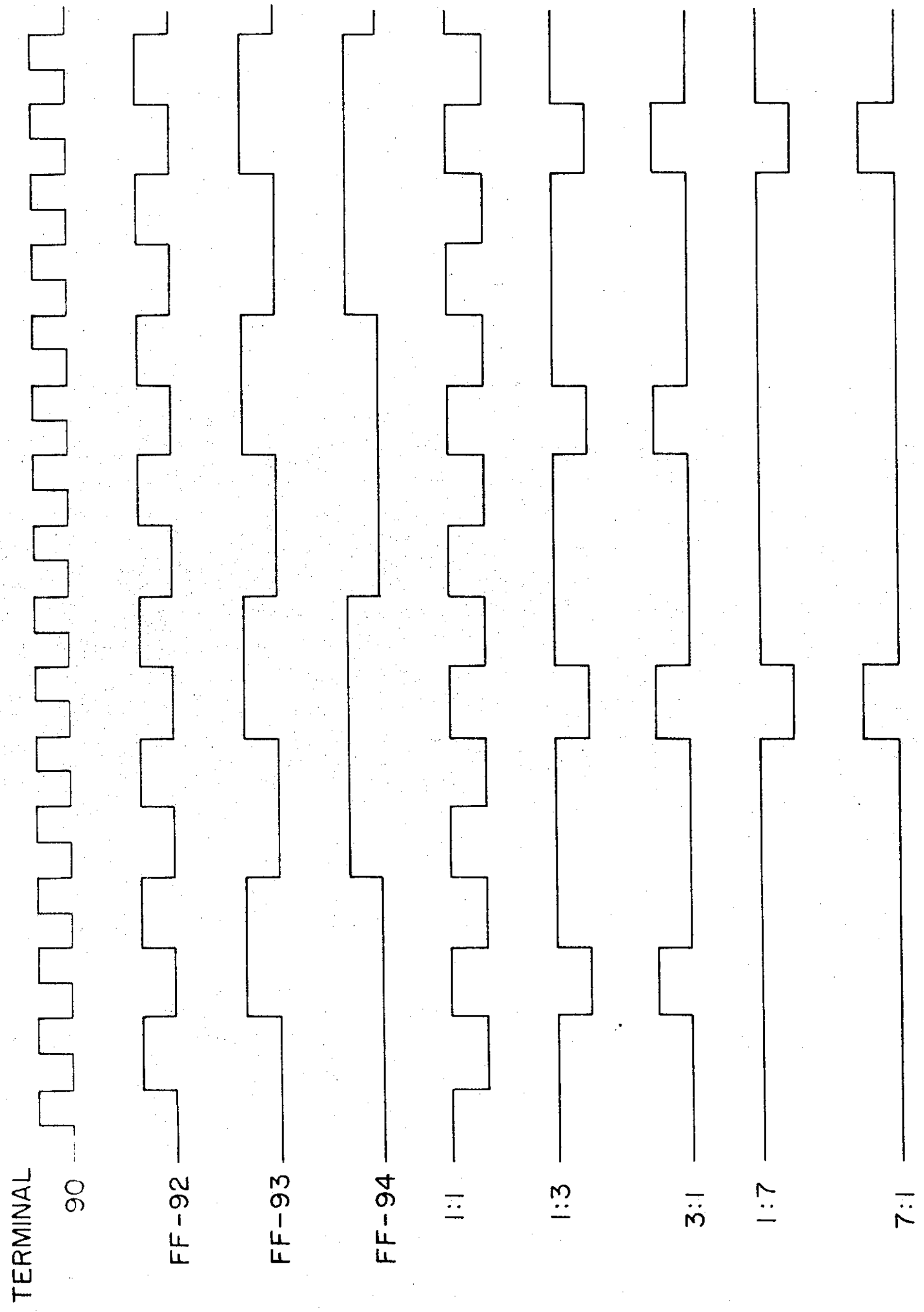
FIG. 8 is a timing diagram of the bit pattern generator of FIG. 5.

Referring to FIG. 8, there is illustrated a timing diagram illustrating the operation of the pattern generator signal 16. The first line of the timing diagram illustrates the pulses at input 90 for any given frequency. The second line of FIG. 8 illustrates the output of flip flop 92 in response to the pulses at the input terminal 90. This output is taken at the one or true output of the flip flop 92. The third line is the one output of flip flop 93 and the fourth line is the one output of the flip flop 94. As previously mentioned, flip flops 92 –94 function as a counter and divide the frequency of the signal at the input 90. The fifth line of FIG. 8 which is labeled 1:1 illustrates the zero output of the flip flop 92 and is the signal at position 100 of the switch 96. This signal is the 1:1 alternate mark space signal wherein the time duration of the mark signal equals the time duration of the space signal. The NAND gate 110 functions to combine the outputs of the flip flops 92 and 93 to generate a 1:3 signal pattern at terminal 101 which is illustrated on the sixth line of FIG. 8. The NAND gate 112 functions to invert the output of the NAND gate 110 to provide a 3:1 signal pattern at terminal 102 as illustrated in line seven of FIG. 8. The NAND gate 114 combines the one output of the flip flop 94 and the output of the NAND gate 112 to generate a signal pattern of 1:7 and is electrically connected to the terminal 103 of the switch 96. The NAND gate 116 inverts the output of the NAND gate 114 to provide a 7:1 signal pattern at the terminal 104. These two signals, 1:7 and 7:1 are illustrated on lines eight and nine respectively of FIG. 8.

The transmission driver 18 is illustrated schematically in FIG. 5 and functions as a level translator to translate the logic level of the NAND gate 108 which is in the preferred embodiment from 0 to plus 5 volts to the standard interface logic levels of the data set which are plus and minus 6 volts. The output of the transmission driver at terminal 118 is electrically connected to the transmit input 23 of the data set 20 being tested.

There has been thus been described the function and operation of the data set tester to generate one or a predetermined number of cyclic bit patterns having a substantially stable and accurate bit rate for test purposes. The frequency source of the signals is a crystal oscillator wherein the frequency of the crystal 38 remains stable. As shown any deviation in the frequency of the crystal is minimized by the many stages of frequency division between the crystal oscillator 10 and the terminal point 118.

FREQUENCY COMPARISON

The frequency comparison unit 30 and its associated indicators 32 and 34 are schematically illustrated in FIG. 6. The frequency comparison unit basically comprises zero crossing signal detecting means 120, a monostable multivibrator 122 and the indicator means 32 and 34 and its associated drive and logic circuitry. The input terminal of the frequency comparison unit may be connected to either the output transmission terminal 25 of the data set being tested or to the output terminal 88 of the bit rate selector 14. As will hereinafter be shown either 1,200 Hz mark frequency or the 2,200 Hz space frequency signals are compared.

The signals being applied at terminal 124 are supplied to a zero crossing signal detecting means 120 which generates a pulse each time the input signal crosses the zero reference line of said input signal. The output of the zero crossing detector 120 is supplied to trigger a monostable multivibrator 122 for generating an output pulse length as determined by the capacitor 134 and the resistor 136 and the variable resistors 130 or 132.

As the output transistor 138 of the multivibrator 122 alternately conducts and non-conducts the respective indicators 32 and 34 are illuminated under control of the interposed logic circuitry.

The initial step for performing the comparison operation is to adjust the multivibrator 122 for the frequency of the standard signal. This is done by setting the selector switch 68–70 to either the 1,200 or the 2200 position and electrically connecting the output terminal 88 of the bit rate selector 14 to the input terminal 124 of the frequency comparison unit. Additionally, the frequency selection switch 125 must be positioned to terminal 126 for comparing the 1,200 Hz signal or to terminal point 128 for comparing the 2,200 Hz signal.

The function of the frequency selection switch 125 is to provide the proper resistance in the R-C timing network of the monostable multivibrator 122. As illustrated in FIG. 6 the resistance value necessary for each frequency is different as the capacitor remains the same, therefore, electrically connected to terminal 126 is a variable resistor 130 for adjustment when initially tuning the multivibrator to the desired frequency of 1,200 Hz. In a similar manner, the variable resistor 132 is electrically connected to terminal point 128 for adjusting when initially timing the multivibrator to the 2,200 Hz signal.

The multivibratoar 122 is initially tuned to the desired standard signal by applying or interconnecting terminal point 88 and terminal point 124 as previously stated. To compare with the 1,200 Hz signal, the frequency selector switch 125 is positioned to terminal 126 and likewise selector switches 68–70 are positioned as shown in FIG. 3. The variable resistor 130 is adjusted so that pulse width of the output pulse of the multivibrator as supplied to the two indicators 32 and 34, causes the indicators to remain lighted in an unstable manner. Once the lights are operating as desired, the interconnection between terminal 88 and 124 is removed and terminal 124 is electrically connected to the output transmit terminal 25 of the data set 20 being tested.

If the frequency of the tested signal from the data set is substantially identical to the tuned frequency of the multivibrator 122, the indicators 32 and 34 will remain lighted with the same degree of instability as with the standard or tuned signal.

Figure 9:
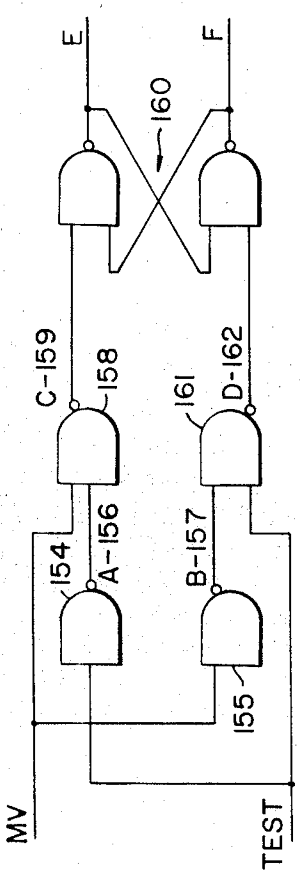
FIG. 9 is a partial logic diagram of the frequency comparison section of FIG. 6.

Referring to FIGS. 9, 10, 11 and 12, the operation of the frequency comparison unit is diagrammatically explained. FIG. 9 is a repeat of the logic circuitry controlling the indicators 32 and 34. The signal line labelled "MV" is the output signal line from the multivibrator 122. The signal line labelled "TEST" is the output of the zero crossing detector 120. It is these two signals which are compared for frequency.

Figure 12:
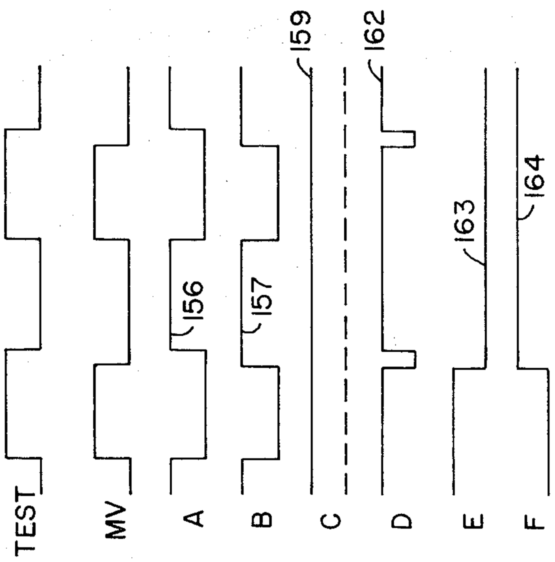
FIGS. 10–12 are voltage waveshape diagrams corresponding to different frequency signals applied to the logic of FIG. 9.
Figure 11:
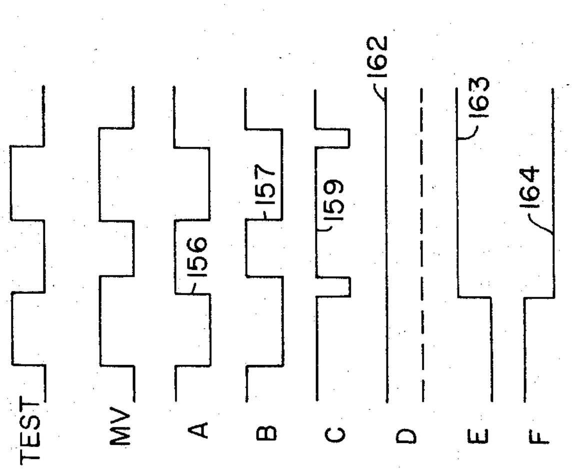
Figure 10:
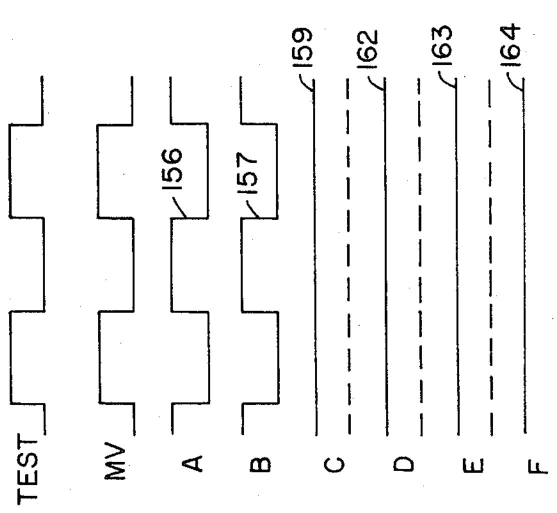

FIG. 10 is the timing diagram for the comparison of both signals, MV and TEST, when the frequency of each signal is substantially the same. The MV signal is logically inverted in the NAND gate 155 and is illustrated in FIGS. 10–12 as the waveshape A signal 156. The TEST signal is logically inverted in the NAND gate 154 and is illustrated in FIGS. 10–12 as the waveshape B signal 157.

The MV signal and the waveshape A signal 156 are combined together in the NAND gate 158 to generate the waveshape C signal 159. When both frequencies are the same, waveshape C signal 159 is a constant high logical signal as illustrated in FIG. 10. This signal is applied to the conventional set input of the cross-coupled NAND gate flip-flop 160 attempting to set the flip flop.

In a like or similar manner, the TEST signal and the waveshape B signal are combined together in the NAND gate 161 to generate the waveshape D signal 162. Likewise, when both frequencies are the same, waveshape D signal 162 is a constant high logical signal as illustrated in FIG. 10. This signal, waveshape D 162 is applied to the conventional reset input of the cross-coupled NAND gate flip-flop 160 attempting to reset the flip flop. With both inputs of the flip flop 160 attempting to switch the flip flop, the flip flop is unstable. This condition may be found by adjusting the data set transmission oscillator until the indicators just toggle as the adjustment is varied between two closely spaced positions.

In FIG. 10, the output of E and F of the flip flop are illustrated as not changing and for clarity, output E 163 is high and output F 164 is low.

FIG. 11 is the diagrammatic illustration of the condition when the frequency of the tested signal is higher than the frequency of the standard signal. In this condition the output of the NAND gate 158 is a pulse as illustrated by waveshape C signal 159. Waveshape D signal 162 remains high but the output signals 163 and 164 of the flip-flop 160 change causing the indicator 32 to light.

FIG. 12 is the diagrammatic illustration of the condition when the frequency of the tested signal is lower than the frequency of the standard signal. In this condition the output of the NAND gate 161 is a pulse as illustrative by waveshape D signal 162. Waveshape C signal 159 remains high but the output signals 163 and 164 of the flip flop 160 change causing the indicator 34 to light.

BIAS DISTORTION MEASUREMENT

Figure 7:
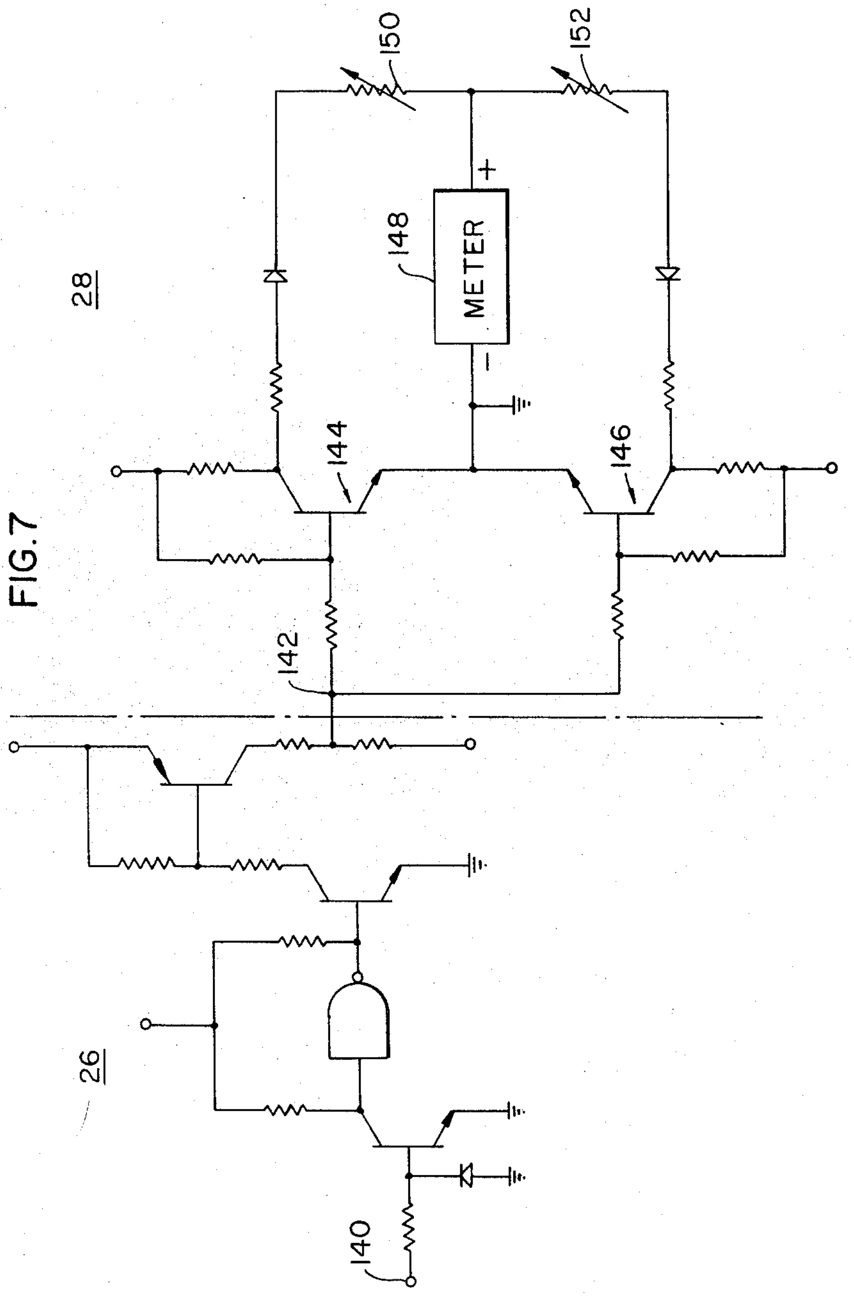
FIG. 7 is a schematic of the receiver driver and the duty cycle meter circuit.

Referring to FIG. 7 there is illustrated in schematic form the circuitry for checking the bias distortion of the signal transmitted from the data set. FIG. 7 comprises the receiver driver 26 and the bias distortion meter circuit 28.

The basic function of the receiver driver circuit is to convert or change the voltage level of the signals received at the input terminal 140 to the voltage range necessary to operate the meter circuit 28. The input terminal 140 is operatively connected to the receive terminal 24 of the data set 20. At the output terminal 142, the voltage swings to drive either transistor 144 or 146 according to whether the signal is a space or mark signal. Depending upon the voltage magnitude at this point 142, either of the two transistors 144 or 146 will conduct to drive the DC meter 148. If the signal at terminal point 142 is a mark signal, transistor 144 will switch to supply the proper amount of current to drive the meter 148 proportional to the duration of the signal. In a similar manner, if the signal at the terminal point 142 is a space signal, the transistor 146 functions as a switch supplying current to drive the meter in the opposite direction proportion to the time duration of the signal.

The meter 148 in the preferred embodiment is a center scale milliameter wherein when no current is flowing through the meter, the meter is at substantially the middle of the scale. When the meter moves in one direction, this represents a space signal and when the meter moves in the opposite direction from the center, this represents a mark signal. To initially set up and calibrate the bias distortion circuit, the output terminal 118 of the transmission drive circuit is directly and electrically connected to the input terminal 140 of the received driver circuit. The bit pattern selector switch 96 is positioned to terminal 98 thereby generating a constant mark signal at the output terminal 118. With this signal being applied to the input terminal 140, the variable resistor 150 is adjusted for full scale deflection of the meter 148 in one direction. Next the bit pattern selector switch 96 is positioned at terminal 99 generating a space signal and the variable resistor 152 is adjusted for full scale deflection of the meter 148 in the opposite direction. As a further check, the pattern selector switch 96 can be positioned to terminal 100 which generates a 1:1 space mark signal and the deflection of the meter 148 should be zero. In a similar manner as the bit pattern selector switch is moved from terminal to terminal for the various ratios of signals to be transmitted by the transmission driver 18, the deflection of the meter 148 with these standard signals will be proportional between the zero mark of the meter for the 1:1 signal and the extreme mark of the meter 148 for the mark or space signal. The meter is an averaging meter and indicates essentially the average voltage level for a given cycle of the signal applied to the terminal 140.

After the initial set up has been completed, terminal point 118 is connected to the transmission input 23 of the data set 20 and terminal point 140 is electrically connected to the receive terminal 24 of the data set 20. The local test wrap around 22 is connected and the quality of the signal being transmitted by the data set is measured. If the meter 148 indicates a value other than the predetermined expected value of the signal being supplied, the slicer circuit in the data set 20 is adjusted accordingly until the meter reads the expected value.

There has thus been shown and described a data set tester which is capable of checking the several different parameters of a data set or a data set system for determining the quality of the information transmitted from and received by said data set. As indicated above, the data set tester is capable of establishing whether the signal transmitted by the data set 20 is at a mark or space level. Additionally, the data set tester is capable of establishing the bias distortion of the signal pattern being received by the data set and provides the necessary indication means for tuning the data set for proper distortion levels. The signal frequency of the signals being transmitted by the data set are visually measured by means of indicators, the sensitivity of which permits small signal frequency deviations from the normal signal frequency to be measured.

What is claimed is:

1. A data set tester for generating known signal patterns for input to a data set, and testing the output signal of said data set, said tester comprising:

- a crystal oscillator for providing a source of high frequency pulses;
- counter means operatively connected to said oscillator for dividing the pulse output of said oscillator into at least two frequency pulse trains having a repetition frequency less than the pulse train from said oscillator;
- bit rate selection means operatively coupled to said counter means, for selecting one of a plurality of signals at the bit rate corresponding to the operation of the data set being tested;
- dividing means responsive to said bit rate selection means for dividing one of said lower frequency pulse trains into a pulse train having a repetition frequency corresponding to said selected bit rate;
- a bit pattern generator responsive to the pulse train from said dividing means for generating a cyclic bit pattern of mark and space signals;
- bias distortion measuring means for indicating the bias distortion of said output signals; and signal frequency comparison means for comparing the frequency of a transmitted signal from the data set being tested with the frequency of the signal from said bit rate selection means.

2. The data set tester according to claim 1 wherein said bias distortion measuring means comprises:

a center scale milliampmeter; and circuit means effective to cause the deflection of said milliampmeter in response to a space signal and similarly responsive to cause an opposite and equal deflection from a mark signal.

3. The data set tester according to claim 1 wherein said signal frequency comparison means comprises:

a zero crossing signal detection means responsive to either the transmitted signals from the data set being tested and the signals from said bit rate selection means and operative to generate a pulse at each zero crossing of said signals;

a monostable multivibrator tuned to the frequency of the signals from said bit rate selection means and responsive to the transmitted signal pulses from said detection means for generating a multivibrator output pulse having a pulse width equal to the pulse width of said tuned frequency;

logical gating means for logically comparing the output pulse from said multivibrator and the signals from said detection means for generating a signal in response to said comparison; and indicator means responsive to the signal from said logical gating means for indicating the frequency of said received signal relative to the tuned frequency of said multivibrator.

* * * * *